(12) United States Patent
Liu et al.

(10) Patent No.: US 11,984,725 B2
(45) Date of Patent: May 14, 2024

(54) FLEXIBLE INTERCONNECTION DEVICE AND METHOD FOR CONTROLLING A FLEXIBLE INTERCONNECTION DEVICE

(71) Applicant: Hitachi Energy Ltd, Zürich (CH)

(72) Inventors: He Liu, Shenzhen (CN); ChunMing Yuan, Beijing (CN)

(73) Assignee: Hitachi Energy Ltd, Zürich (CH)

( * ) Notice: Subject to any disclaimer, the term of this patent is extended or adjusted under 35 U.S.C. 154(b) by 195 days.

(21) Appl. No.: 17/641,997

(22) PCT Filed: Sep. 11, 2019

(86) PCT No.: PCT/CN2019/105403
§ 371 (c)(1),
(2) Date: Mar. 10, 2022

(87) PCT Pub. No.: WO2021/046760
PCT Pub. Date: Mar. 18, 2021

(65) Prior Publication Data
US 2022/0385071 A1    Dec. 1, 2022

(51) Int. Cl.
*H02J 3/18* (2006.01)
*H02J 3/16* (2006.01)

(52) U.S. Cl.
CPC . *H02J 3/18* (2013.01); *H02J 3/16* (2013.01)

(58) Field of Classification Search
CPC ..................................... H02J 3/18; H02J 3/16
USPC .......................................................... 307/24
See application file for complete search history.

(56) References Cited

U.S. PATENT DOCUMENTS

| 2012/0173035 A1 | 7/2012 | Abe |
| 2014/0009980 A1 | 1/2014 | Divan et al. |
| 2015/0137520 A1 | 5/2015 | Garcia |
| 2018/0026449 A1 | 1/2018 | Benosman et al. |

(Continued)

FOREIGN PATENT DOCUMENTS

| CN | 101295878 A | 10/2008 |
| CN | 102222922 A | 10/2011 |
| CN | 104396113 A | 3/2015 |

(Continued)

OTHER PUBLICATIONS

Okada, Naotaka, "Verification of Control Method for a Loop Distribution System using Loop Power Flow Controller", 2006 IEEE PES Power Systems Conference and Exposition, Atlanta, GA, USA, Oct. 29-Nov. 1, 2006, pp. 2116-2123.

*Primary Examiner* — Daniel Cavallari
*Assistant Examiner* — Dru M Parries
(74) *Attorney, Agent, or Firm* — Slater Matsil, LLP

(57) ABSTRACT

A method can be used to control a flexible interconnection device that includes a number of converters. The method includes receiving a plurality of voltage signals indicating respective voltages of a plurality of load branches and a plurality of current signals indicating respective currents of the plurality of load branches, determining reference active power values for each of the plurality of converters based on the plurality of voltage signals and a plurality of reference voltage signals, determining reference reactive power values for each of the plurality of converters based on the plurality of voltage signals, the plurality of reference voltage signals and the plurality of current signals, and controlling the plurality of converters based on the determined reference active power values and the determined reference reactive power values.

16 Claims, 4 Drawing Sheets

(56) References Cited

U.S. PATENT DOCUMENTS

2018/0342871 A1    11/2018   Adamczyk et al.

FOREIGN PATENT DOCUMENTS

| CN | 105978011 A | 9/2016 |
|---|---|---|
| CN | 107408819 A | 11/2017 |
| CN | 110011355 A | 7/2019 |
| CN | 110114951 A | 8/2019 |
| JP | 2001028887 A | 1/2001 |
| JP | 2006191714 A | 7/2006 |
| JP | 2011061970 A | 3/2011 |
| JP | 2012010530 A | 1/2012 |
| JP | 2015220850 A | 12/2015 |
| JP | 2018107959 A | 7/2018 |
| JP | 2019528031 A | 10/2019 |
| WO | 2018049473 A1 | 3/2018 |
| WO | 2018124123 A1 | 7/2018 |

FLEXIBLE INTERCONNECTION DEVICE AND METHOD FOR CONTROLLING A FLEXIBLE INTERCONNECTION DEVICE

CROSS-REFERENCE TO RELATED APPLICATIONS

This application is a national stage application of International Application No. PCT/CN2019/105403, filed on Sep. 11, 2019, which application is hereby incorporated herein by reference.

TECHNICAL FIELD

Example embodiments of the present disclosure generally relate to an electrical field, and more particularly, to a flexible interconnection device and a method for controlling a flexible interconnection device (FID).

BACKGROUND

With development of renewable energy and continuous growth of power consumption, conventional distribution networks are becoming more and more complex, and facing more and more challenges, such as voltage violation, lower power factor, and unbalanced load distribution among different feeders.

On the other hand, conventional distribution networks involve complex and swift telecommunication to control operation of feeders. In case of telecommunication fault, feeders may lose control from the controlling center, causing severe problems.

Various approaches have been proposed to solve at least one of the above challenges. "Verification of control method for a loop distribution system using a loop power flow controller", N. Okada, *Proc. IEEE PES Power Systems Conference and Exposition,* 2006, pp. 2116-2123, proposed a two-terminal 'loop flow controller (LPC)' with a standalone control system. The standalone control system is achieved based on the active power flow and reactive power control method using local voltage. However, the standalone control system involves very complex computation, requiring huge computing resources and costs, and is limited to a two-terminal system.

SUMMARY

Example embodiments of the present disclosure propose a solution of controlling a FID.

In a first aspect, a method for controlling a FID including a plurality of converters is provided. The method comprises receiving a plurality of voltage signals indicating respective voltages of a plurality of load branches and a plurality of current signals indicating respective currents of the plurality of load branches; determining reference active power values for each of the plurality of converters based on the plurality of voltage signals and a plurality of reference voltage signals; determining reference reactive power values for each of the plurality of converters based on the plurality of voltage signals, the plurality of reference voltage signals and the plurality of current signals; and controlling the plurality of converters based on the determined reference active power values and the determined reference reactive power values.

In a second aspect, it is provided a FID. The FID comprises one or more processors configured to perform the method of the first aspect.

In a third aspect, it is provided an electronic system. The electronic system comprises the FID of the second aspect.

In a fourth aspect, it is provided a method for manufacturing a flexible interconnection device. The method comprises providing one or more processors configured to perform the method of the first aspect with one or more programs stored in a storage medium.

In a fifth aspect, it is provided a computer-readable storage medium storing one or more programs configured to be executed by one or more processors of a FID including a plurality of converters. The one or more programs include instructions for performing the methods of first aspect.

According to the embodiments of the present disclosure, the solution according to embodiments of the present disclosure may achieve balance load between different feeders, even in the case of telecommunication fault.

BRIEF DESCRIPTION OF THE DRAWINGS

Through the following detailed descriptions with reference to the accompanying drawings, the above and other objectives, features and advantages of the example embodiments disclosed herein will become more comprehensible. In the drawings, several example embodiments disclosed herein will be illustrated in an example and in a non-limiting manner, wherein.

Throughout the drawings, the same or corresponding reference symbols refer to the same or corresponding parts.

DETAILED DESCRIPTION OF ILLUSTRATIVE EMBODIMENTS

Figure 1:
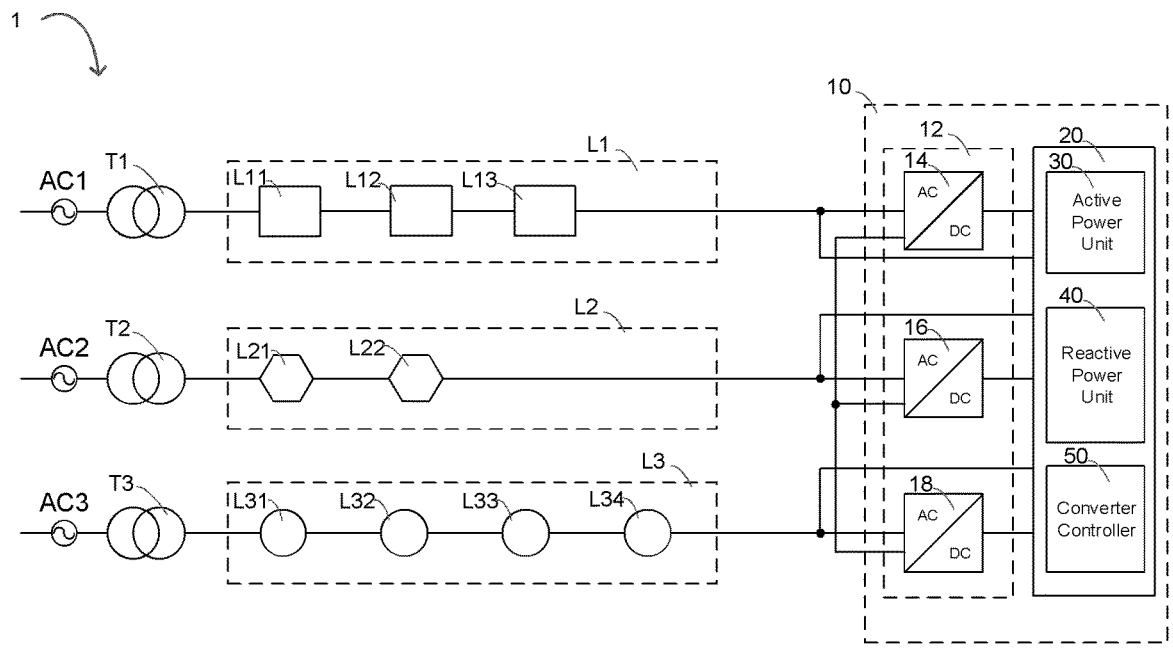
FIG. 1 illustrates an electrical system in accordance with some example embodiments of the present disclosure.

The subject matter described herein will now be discussed with reference to several example embodiments. These embodiments are discussed only for the purpose of enabling those skilled persons in the art to better understand and thus implement the subject matter described herein, rather than suggesting any limitations on the scope of the subject matter.

The term "comprises" or "includes" and its variants are to be read as open terms that mean "includes, but is not limited to." The term "or" is to be read as "and/or" unless the context clearly indicates otherwise. The term "based on" is to be read as "based at least in part on." The term "being operable to" is to mean a function, an action, a motion or a state can be achieved by an operation induced by a user or an external mechanism. The term "one embodiment" and "an embodiment" are to be read as "at least one embodiment." The term "another embodiment" is to be read as "at least one other embodiment."

Unless specified or limited otherwise, the terms "mounted," "connected," "supported," and "coupled" and variations thereof are used broadly and encompass direct and indirect mountings, connections, supports, and couplings. Furthermore, "connected" and "coupled" are not restricted to physical or mechanical connections or couplings. In the description below, like reference numerals and labels are used to describe the same, similar or corresponding parts in the Figures. Other definitions, explicit and implicit, may be included below.

As mentioned above, the conventional distribution network is facing challenges, such as voltage violation, lower power factor, and unbalanced load distribution among different feeders. In addition, conventional distribution network requires telecommunication between the global controlling center and the various feeders. In of telecommunication fault, feeders may lose control from the controlling center causing severe problems. Although a standalone strategy has been proposed, it requires very complex computation and costs computing resources.

FIG. 1 illustrates an electrical system 1 in accordance with some example embodiments of the present disclosure. The electrical system 1 includes three alternating current (AC) sources AC1, AC2 and AC3. The three AC sources can be considered as three feeders to provide electrical powers. The three AC sources are coupled to three transformers T1, T2 and T3, respectively.

Each of the three transformers T1, T2 and T3 includes a primary side and a secondary side to transform from a first voltage at the primary side to a second voltage at the secondary side. The three transformers T1, T2 and T3 are coupled to three load branches L1, L2 and L3, respectively. Each load branch has a plurality of loads coupled thereto.

In FIG. 1, three loads L11, L12 and L13 are coupled to the load branch L1, two loads L21 and L22 are coupled to the load branch L2, and four loads L31, L32, L33 and L34 are coupled to the load branch L3. In an example, the loads L11, L12 and L3 may be commercial loads, the loads L21 and L22 may be residential loads, and the loads L31, L32, L33 and L34 may be industrial loads.

Although different numbers of loads have been illustrated to be in the load branches, this is only for illustration without suggesting any limitations as to the scope of the subject matter described here. In an example, numbers of loads on the load branches can be any number.

Although three AC sources AC1, AC2 and AC3 have been illustrated in FIG. 1, this is only for illustration without suggesting any limitations as to the scope of the subject matter described here. In an example, the electrical system 1 may include two or more than three AC sources. In this case, the transformers and the load branches may be adapted for each of the AC sources, correspondingly.

In another example, there is only one AC source for all load branches. In this case, a plurality of transformers may be responsible for providing different power supplies. For example, the secondary sides of the transformers may be adjusted between different voltages, such as 9.5 kV~10.5 kV.

The load branches L1, L2 and L3 are coupled to the FID 10. The FID herein refers to a device that can be extended flexibly to include any number of branches coupling to feeders, such that the feeders can be incorporated into or removed from the electrical system.

The FID 10 may include a converter unit 12 and a controlling device 20. The converter unit 12 may include a plurality of converters corresponding to the load branches. The FID 10 may include at least one sensor (not shown) to sense a plurality of voltage signals indicating respective voltages of a plurality of load branches and a plurality of current signals indicating respective currents of the plurality of load branches.

In another example, the FID 10 may receive, from outside sensors, the plurality of voltage signals indicating respective voltages of a plurality of load branches and a plurality of current signals indicating respective currents of the plurality of load branches.

In the example of FIG. 1, the converter unit 12 includes three converters 14, 16 and 18. The converters 14, 16 and 18 are coupled to each other, such that electrical power can be distributed among them.

The converters 14, 16 and 18 may operate independently to convert an AC voltage to a DC voltage or convert a DC voltage to an AC voltage, and may independently operate to source or sink energy in accordance with control of the controlling device 20.

Although the converter unit 12 is illustrated in the FID 10 in FIG. 1, this is only for illustration without suggesting any limitations as to the scope of the subject matter described here. In an example, the FID 10 may include a converter unit outside the FID 10.

In an example, the controlling device 20 may include an active power unit 30, a reactive power unit 40 and a converter controller 50. The active power unit 30 may receive a plurality of voltage signals indicating respective voltages of a plurality of load branches, and may determine active power for each feeder based on the plurality of voltage signals and a plurality of reference voltage signals.

For example, the active power unit 30 may receive voltage signals indicating respective voltages of the load branches L1, L2 and L3. The voltages of the load branches L1, L2 and L3 may be collected or sensed by sensors (not shown) located anywhere in the load branches L1, L2 and L3, for example, the nodes between the secondary sides of the transformers T1, T2 and T3 and the first loads L11, L21 and L31, or the nodes between the loads in the load branches L1, L2 and L3.

In another example, the voltages of the load branches L1, L2 and L3 may be collected or sensed between the last nodes L13, L22 and L34 and the converters 13, 16 and 18 by sensors (not shown), respectively.

In an example, the plurality of reference voltage signals may represent the nominal voltages defined by grid codes, such as 10 kV. In another example, the plurality of reference voltage signals may represent voltages at the secondary sides of the transformer T1, T2 and T3.

The active power unit 30 may then determine reference active power values for each of the converters 14, 16 and 18 based on the plurality of voltage signals and the plurality of reference voltage signals. Details of the determination will be described below with reference to FIG. 2.

The voltages of the load branches L1, L2 and L3 and the currents of the load branches L1, L2 and L3 may be collected or sensed by sensors (not shown) anywhere in the load branches L1, L2 and L3, for example, the nodes between the secondary sides of the transformers T1, T2 and T3 and the first loads L11, L21 and L31, or the nodes between the loads in the load branches L1, L2 and L3.

In another example, the load branches L1, L2 and L3 may be collected or sensed between the last nodes L13, L22 and L34 and the converters 13, 16 and 18 by sensors (not shown), respectively.

In an example, the plurality of reference voltage signals may represent the nominal voltage of the electrical network, such as 10 kV. In another example, the plurality of reference voltage signals may represent voltages at the secondary sides of the transformer T1, T2 and T3.

The reactive power unit 40 may determine reference active power values for each of the converters 14, 16 and 18 based on the plurality of voltage signals, the plurality of reference voltage signals and the plurality of current signals. Details of the determination will be described below. Details of the determination will be described below with reference to FIG. 3.

The converter controller 50 may control the converter unit 12 to distribute power among them based on the determined reference active power values and the determined reference reactive power values.

Although the active power unit 30, the reactive power unit 40 and the converter controller 50 are illustrated to be independent, this is only for illustration without suggesting any limitations as to the scope of the subject matter described here. In an example, the active power unit 30, the reactive power unit 40 and the converter controller 50 may be implemented as one unit.

For example, the active power unit 30, the reactive power unit 40 and the converter controller 50 may be implemented as one or more programs stored in a computer-readable storage medium. The one or more programs are configured to be executed by one or more processors (not shown) in the flexible interconnection device 10.

In another example, the active power unit 30, the reactive power unit 40 and the converter controller 50 may be implemented as a hardware device, such as a field programmable gate array (FPGA) device.

Figure 2:
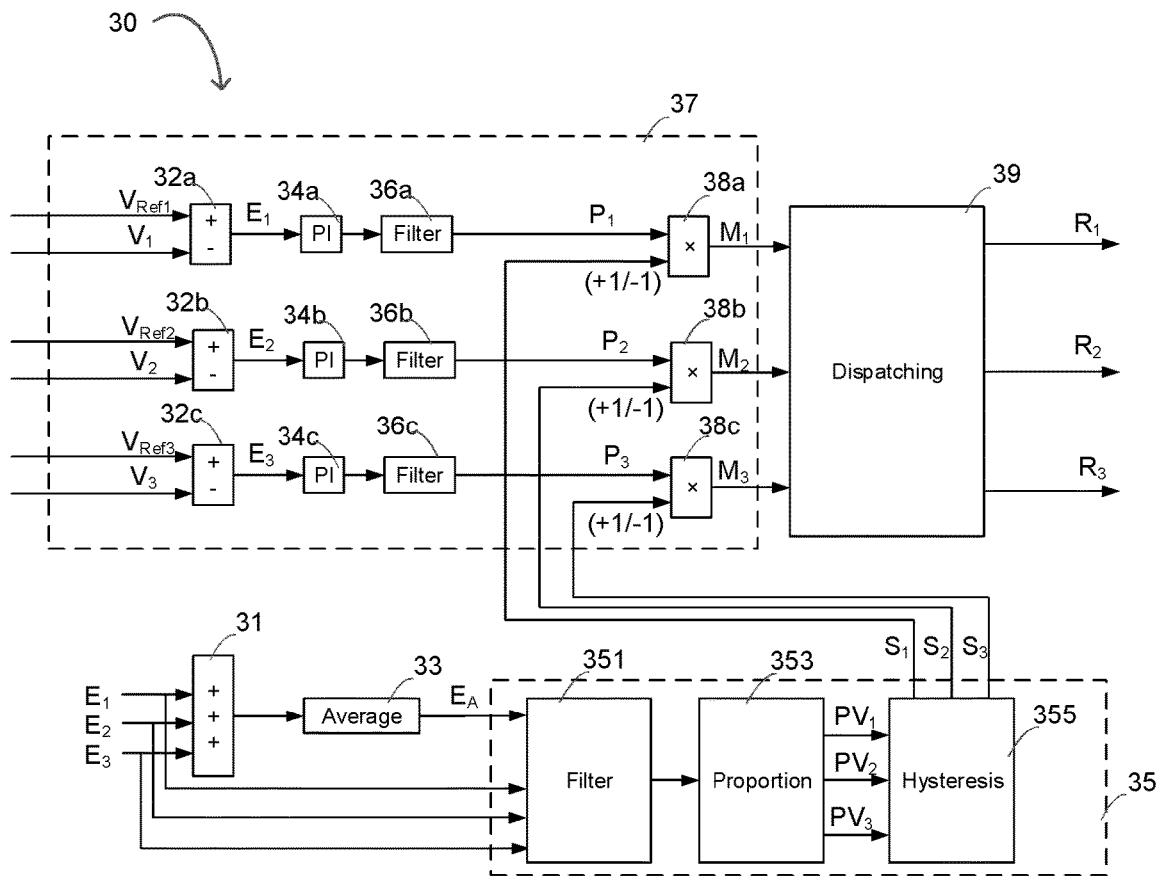
FIG. 2 illustrates an active power unit of FIG. 1 in accordance with some example embodiments of the present disclosure.

FIG. 2 illustrates an active power unit 30 of FIG. 1 in accordance with some example embodiments of the present disclosure. The active power unit 30 may include a sorting unit 35, a voltage control unit 37 and a dispatching unit 39.

The voltage control unit 37 may include a plurality of voltage control branches, and the number of the voltage control branches corresponds to the number of the load branches. In FIG. 2, there are three voltage control branches corresponding to the three load branches.

In the first voltage control branch, it is to compute a voltage difference $E_1$ between the voltage signal $V_1$ of the first load branch L1 and a first reference voltage signal $V_{Ref1}$ of the plurality of the reference voltage signals by the first adding unit 32a.

In the second voltage control branch, it is to compute a voltage difference $E_2$ between the voltage signal $V_2$ of the second load branch $L_2$ and a second reference voltage signal $V_{Ref2}$ of the plurality of the reference voltage signals by the second adding unit 32b.

In the third voltage control branch, it is to compute a voltage difference $E_3$ between the voltage signal $V_3$ of the third load branch $L_3$ and a third reference voltage signal $V_{Ref3}$ of the plurality of the reference voltage signals by the third adding unit 32c.

The voltage differences $E_1$, $E_2$ and $E_3$, are then integrated by the first proportion integrator (PI) 34a, the second PI 34b and the third PI 34c respectively to generate integral values, and then filtered by the first filter 36a, the second filter 36b and the third filter 36c respectively to determine absolute values $P_1$, $P_2$ and $P_3$ of active power for the three converters.

The first multiplier 38a, the second multiplier 38b and the third multiplier 38c multiply the three absolute values $P_1$, $P_2$ and $P_3$ with respective sorting signs (+1/−1) corresponding to the absolute values to compute the active power values for the three feeders. The sorting signs may be selected from a group of +1 and −1, respectively.

The voltage differences $E_1$, $E_2$ and $E_3$ are summed by an adder 31, and the sum of the voltage differences $E_1$, $E_2$ and $E_3$ is then averaged by an averaging unit 33 to generate an average value $E_A$ of the sum of the voltage differences $E_1$, $E_2$ and $E_3$. The average value $E_A$, and the voltage differences $E_1$, $E_2$ and $E_3$ are transmitted to the sorting unit 35. By applying the sorting unit 35, it may manage every single converter of the FID to work in the inverter/rectifier mode.

The sorting unit 35 is configured to generate the sorting signs based on the plurality of voltage signals and the plurality of reference voltage signals. Specifically, the sorting unit 35 is configured to generate the sorting signs based on the average value $E_A$, and the voltage differences $E_1$, $E_2$ and $E_3$ associated with the plurality of voltage signals and the plurality of reference voltage signals.

In an example, the sorting unit 35 includes a filter 351, a proportion unit 353 and a hysteresis block 355. The average value $E_A$, and the voltage differences $E_1$, $E_2$ and $E_3$ are filtered by the filter 351 to filter out noises. In another example, the sorting unit 35 may only include a proportion unit 353 and a hysteresis block 355 without filtering.

The proportion unit 353 is configured to computing proportions between the voltage differences $E_1$, $E_2$ and $E_3$ and the average value $E_A$, respectively. In the example of FIG. 2, the proportion unit 353 outputs proportion values $PV_1=E_1/E_A$, $PV_2=E_2/E_A$ and $PV_3=E_3/E_A$, respectively to the hysteresis block 355.

The hysteresis block 355 is configured to determine the sorting signs for the proportions, respectively. In an example, the hysteresis block 355 includes a first hysteresis threshold and a second hysteresis threshold below the first hysteresis threshold. Each of the proportion values $PV_1$, $PV_2$ and $PV_3$ is compared with at least one of the two hysteresis thresholds.

The output $S_1$ of the hysteresis block 355 changes from a first sign to a second sign opposite to the first sign, in case that the proportion value $PV_1$ exceeds or equals to the first hysteresis threshold of the hysteresis block 355. In an example, the first sign is +1 and indicative of absorbing energy, and the second sign is −1 and indicative of outputting energy.

Analogously, the output $S_2$ of the hysteresis block 355 changes from the first sign to the second sign opposite to the first sign, in case that the proportion value $PV_2$ exceeds or equals to the first hysteresis threshold of the hysteresis block 355, and the output $S_3$ of the hysteresis block 355 changes from the first sign to the second sign opposite to the first sign, in case that the proportion value $PV_3$ exceeds or equals to the first hysteresis threshold of the hysteresis block 355.

The inventors discovers that the hysteresis width between the first and second hysteresis thresholds is related to the active power balance result ($P_{balance}$), converter conversion frequency ($f_{conversion}$) (conversion from inverter/rectifier operation mode to rectifier/inverter operation mode), and power losses of FID system ($P_{loss}$). In an example, the hysteresis width may be selected based on at least one of $P_{balance}$, $f_{conversion}$, and $P_{loss}$.

The following Table 1 illustrates an example of FID system operation characteristics for exemplary hysteresis width settings.

TABLE 1

FID system operation characteristics for exemplary hysteresis width settings

| Restrictive Conditions | Hysteresis Width | Balance effects | Operation characteristics |
|---|---|---|---|
| $P_{balance}$ | Small (Hysteresis width: 0.96~1) | The effect of substation output active power balance is good. | 1. Converter conversion frequency is high. 2. Voltage fluctuation frequency is high. 3. Losses of FID system are high. 4. Reliability of FID system is low |
| $P_{balance}$ + $f_{conversion}$ | Medium (Hysteresis width: 0.9~0.95) | The effect of substation output active power balance is medium. | 1. Converter conversion frequency is medium. 2. Voltage fluctuation frequency is medium. 3. Losses of FID system are medium. 4. Reliability of FID system is medium |
| $P_{balance}$ + $f_{conversion}$ + $P_{loss}$ | Large (Hysteresis width: 0.8~0.9) | The effect of substation output active power balance is bad. | 1. Converter conversion frequency is low. 2. Voltage fluctuation frequency is low. 3. Losses of FID system are low. 4. Reliability of FID system is high |

Although Table 1 illustrates a specific example of hysteresis width and related characteristics, this is only for illustration without suggesting any limitations as to the scope of the subject matter described here. For example, the hysteresis width defined by the first and second hysteresis thresholds may be changed according to the specifications of actual engineering application.

The generated sorting signs $S_1$, $S_2$ and $S_3$ may be independently selected from a group of +1 and −1 in this example. The multiplier 38a multiplies the absolute values $P_1$ with the sorting sign $S_1$ to compute a first active power value $M_1$. The multiplier 38b multiplies the absolute values $P_2$ with the sorting sign $S_2$ to compute a second active power value $M_2$. The multiplier 38c multiplies the absolute values $P_3$ with the sorting sign $S_3$ to compute a third active power value $M_3$.

The dispatching unit 39 receives the three active power values $M_1$, $M_2$ and $M_3$, and is configured to dispatch active power to generate the reference active power values for the plurality of converters based on the computed active power values, respectively. Although the dispatching unit 39 for the three converters is illustrated in FIG. 2, this is only for illustration without suggesting any limitations as to the scope of the subject matter described here. For example, in case of two converters or more than four converters, the dispatching unit 39 can be analogously configured to dispatch powers for each of the converters.

In FIG. 2, the dispatching unit 39 may generates a first reference active power value $R_1$ for the first converter, a second reference active power value $R_2$ for the first converter and a third reference active power value $R_3$ for the first converter based on the three active power values $M_1$, $M_2$ and $M_3$.

If the active power value is greater than 0, it represents that the converter for the active power value needs to absorb energy from other converters. On the other hand, if the active power value is below 0, it represents that the converter for the active power value needs to output energy to other converters.

In the example of three converters in FIG. 2, the operation principle of the dispatching unit 39 can be represented as below.

In case that $M_1<0$, $M_2>0$ and $M_3>0$, $R_1=-(M_2+M_3)$, $R_2=M_2$ and $R_3=M_3$;

In case that $M_1<0$, $M_2<0$ and $M_3>0$, $R_1=-M_3/2$, $R_2=-M_3/2$ and $R_3=M_3$;

In case that $M_1<0$, $M_2>0$ and $M_3<0$, $R_1=-M_2/2$, $R_2=M_2$ and $R_3=-M_2/2$;

In case that $M_1>0$, $M_2<0$ and $M_3<0$, $R_1=M_1$, $R_2=-M_1/2$ and $R_3=-M_1/2$;

In case that $M_1>0$, $M_2<0$ and $M_3>0$, $R_1=M_1$, $R_2=-(M_1+M_3)$ and $R_3=M_3$; and In case that $M_1>0$, $M_2>0$ and $M_3<0$, $R_1=M_1$, $R_2=M_2$ and $R_3=-(M_1+M_2)$.

To sum up, the dispatching unit 39 is configured to output, for the computed active power value of greater than 0, the computed active power value as the reference active power value, and output, for the computed active power value of below 0, a shared active power value as the reference active power value, the shared active power value representing a sum of the computed active power values of greater than 0 dividing by a number of the computed active power values of below 0.

Although the above dispatching algorithm is discussed with respect to a three-converter unit, this is only for illustration without suggesting any limitations as to the scope of the subject matter described here.

For example, in a four-converter unit, the dispatching unit may also be configured to output, for the computed active power value of greater than 0, the computed active power value as the reference active power value, and output, for the computed active power value of below 0, a shared active power value as the reference active power value, the shared active power value representing a sum of the computed active power values of greater than 0 dividing by a number of the computed active power values of below 0.

As a result, the dispatching unit 39 may cause the converter controller 50 to control operation of the converters 14, 16 and 18 without reliance on telecommunication from a global controlling center, such that power can be transferred among load braches L1, L2 and L3, and the balance can be achieved for the feeders.

Even in case of a telecommunication fault, the FID 10 can operate effectively and appropriately. In addition, the FID 10 in the embodiment has capability to accommodate various numbers of converters without complex computation. In other words, the FID 10 is flexible and compatible with the numbers of converters.

Figure 3:
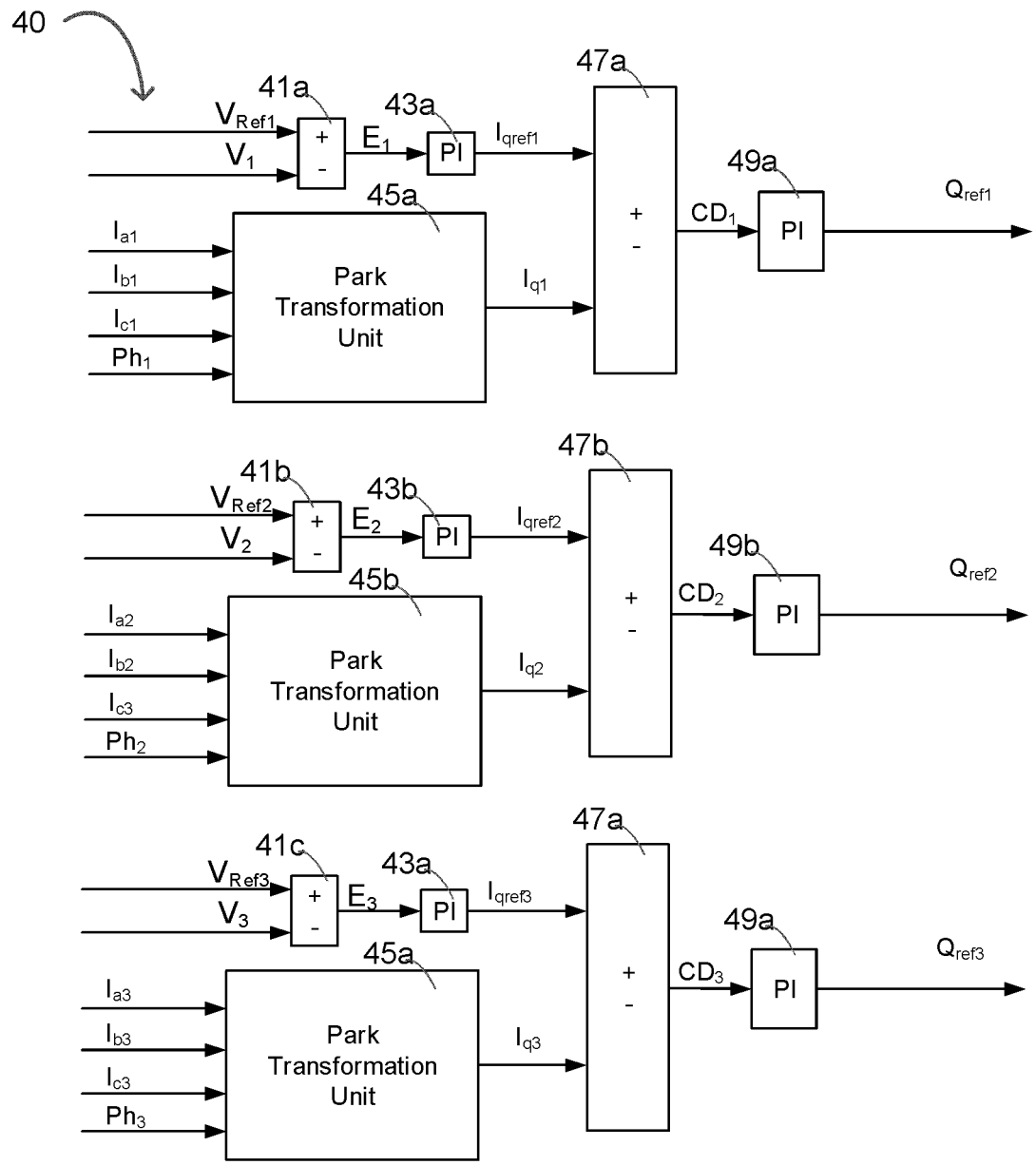
FIG. 3 illustrates a reactive power unit of FIG. 1 in accordance with some example embodiments of the present disclosure.

FIG. 3 illustrates a reactive power unit 40 of FIG. 1 in accordance with some example embodiments of the present disclosure. The reactive power unit 40 includes three reactive power branches for the three converters 14, 16 and 18.

Although three reactive power branches are illustrated in FIG. 3, this is only for illustration without suggesting any limitations as to the scope of the subject matter described here. For example, the reactive power unit 40 may include two or more than three reactive power branches, with the number corresponding to the number of the converters.

In the first branch, a first voltage difference $E_1$ can be computed based on the voltage signal $V_1$ of the first load branch $L_1$ and a first reference voltage signal $V_{Ref1}$ of the plurality of the reference voltage signals by the first adding unit 41a.

The voltage signal $V_1$ of the first load branch $L_1$ and a first reference voltage signal $V_{Ref1}$ of the plurality of the reference voltage signals may be the same as those in FIG. 2. In another example, the first voltage difference $E_1$ may be directly from the first adding unit 32a of FIG. 2.

The first voltage difference $E_1$ is then integrated by a PI 43a to generate the first reference current signal $I_{qref1}$. The first branch further includes a Park Transformation Unit 45a receiving the three phase currents $I_{a1}$, $I_{b1}$ and $I_{c1}$ of a current signal indicating the current in the first load branch L1, and a first phase angle $Ph_1$. The first phase angle $Ph_1$ represents an angle of the three-phase AC voltage of the first load branch L1 projecting to a two-phase coordinate system.

The Park Transformation Unit 45a may generate a first reactive current signal $I_{q1}$ based on the three phase currents $I_{a1}$, $I_{b1}$ and $I_{c1}$, and the first phase angle $Ph_1$. A first current difference $CD_1$ is computed by a first adder 47a based on the first reference current signal $I_{qref1}$ and the first reactive current signal $I_{q1}$. The first current difference $CD_1$ is then integrated by the first PI 49a to generate a first reference reactive power value $Q_{ref1}$.

In the second branch, a second voltage difference $E_2$ can be computed based on the voltage signal $V_2$ of the second load branch L2 and a second reference voltage signal $V_{Ref2}$ of the plurality of the reference voltage signals by the second adding unit 41b.

The voltage signal $V_2$ of the second load branch L2 and a second reference voltage signal $V_{Ref2}$ of the plurality of the reference voltage signals may be the same as those in FIG. 2. In another example, the second voltage difference $E_2$ may be directly from the second adding unit 32b of FIG. 2.

The second voltage difference $E_2$ is then integrated by a PI 43b to generate the second reference current signal $I_{qref2}$. The second branch further includes a Park Transformation Unit 45b receiving the three phase currents $I_{a2}$, $I_{b2}$ and $I_{c2}$ of another current signal indicating the current in the second load branch L2, and a second phase angle $Ph_2$. The second phase angle $Ph_2$ represents an angle of the three-phase AC voltage of the second load branch L2 projecting to a two-phase coordinate system.

The Park Transformation Unit 45b may generate a second reactive current signal $I_{q2}$ based on the three phase currents $I_{a2}$, $I_{b2}$ and $I_{c2}$ and the second phase angle $Ph_2$. A second current difference $CD_2$ is computed by a second adder 47b based on the second reference current signal $I_{qref2}$ and the second reactive current signal $I_{q2}$. The second current difference $CD_2$ is then integrated by the second PI 49b to generate a second reference reactive power value $Q_{ref2}$.

In the third branch, a third voltage difference $E_3$ can be computed based on the voltage signal $V_3$ of the third load branch L3 and a third reference voltage signal $V_{Ref3}$ of the plurality of the reference voltage signals by the third adding unit 41c.

The voltage signal $V_3$ of the third load branch L3 and a third reference voltage signal $V_{Ref3}$ of the plurality of the reference voltage signals may be the same as those in FIG. 2. In another example, the third voltage difference $E_3$ may be directly from the third adding unit 32c of FIG. 2.

The third voltage difference $E_3$ is then integrated by a PI 43c to generate the third reference current signal $I_{qref3}$. The third branch further includes a Park Transformation Unit 45c receiving the three phase currents $I_{a3}$, $I_{b3}$ and $I_{c3}$ of a further current signal indicating the current in the third load branch L3, and a third phase angle $Ph_3$. The third phase angle $Ph_3$ represents an angle of the three-phase AC voltage of the third load branch L3 projecting to a two-phase coordinate system.

The Park Transformation Unit 45c may generate a third reactive current signal $I_{q3}$ based on the three phase currents $I_{a3}$, $I_{b3}$ and $I_{c3}$ and the third phase angle $Ph_3$. A third current difference $CD_3$ is computed by a third adder 47c based on the third reference current signal $I_{qref3}$ and the third reactive current signal $I_{q3}$. The third current difference $CD_3$ is then integrated by the third PI 49c to generate a third reference reactive power value $Q_{ref3}$.

The converter controller 50 receives the reference reactive power values $Q_{ref1}$, $Q_{ref2}$ and $Q_{ref3}$, and control operation of the converters 14, 16 and 18 without reliance on telecommunication from a global controlling center to distribute reactive power among the converters 14, 16 and 18. By distributing reactive power for each of the three converters 14, 16 and 18, the electrical system may operate in a more effectively.

By sensing or receiving voltage and currents of load branches, the computing unit in the FID may determine reference active power values and reference reactive power values for each of the converters. The converters may operate based on the reference active power values and reference reactive power values without reliance on telecommunication from a global controlling center far away from the FID.

In this event, even if the telecommunication fault such as cable disconnection occurs, the electrical system including the FID may operate safely and effectively, because excessive power from one or more branch load is equally shared by other branch loads in the electrical system. As such, balance can be achieved among the feeders in the electrical system. In addition, the FID herein may extend to a multiple-terminal system, and the system thus can be flexibly configured without costing complex computation.

Figures 4, 5:
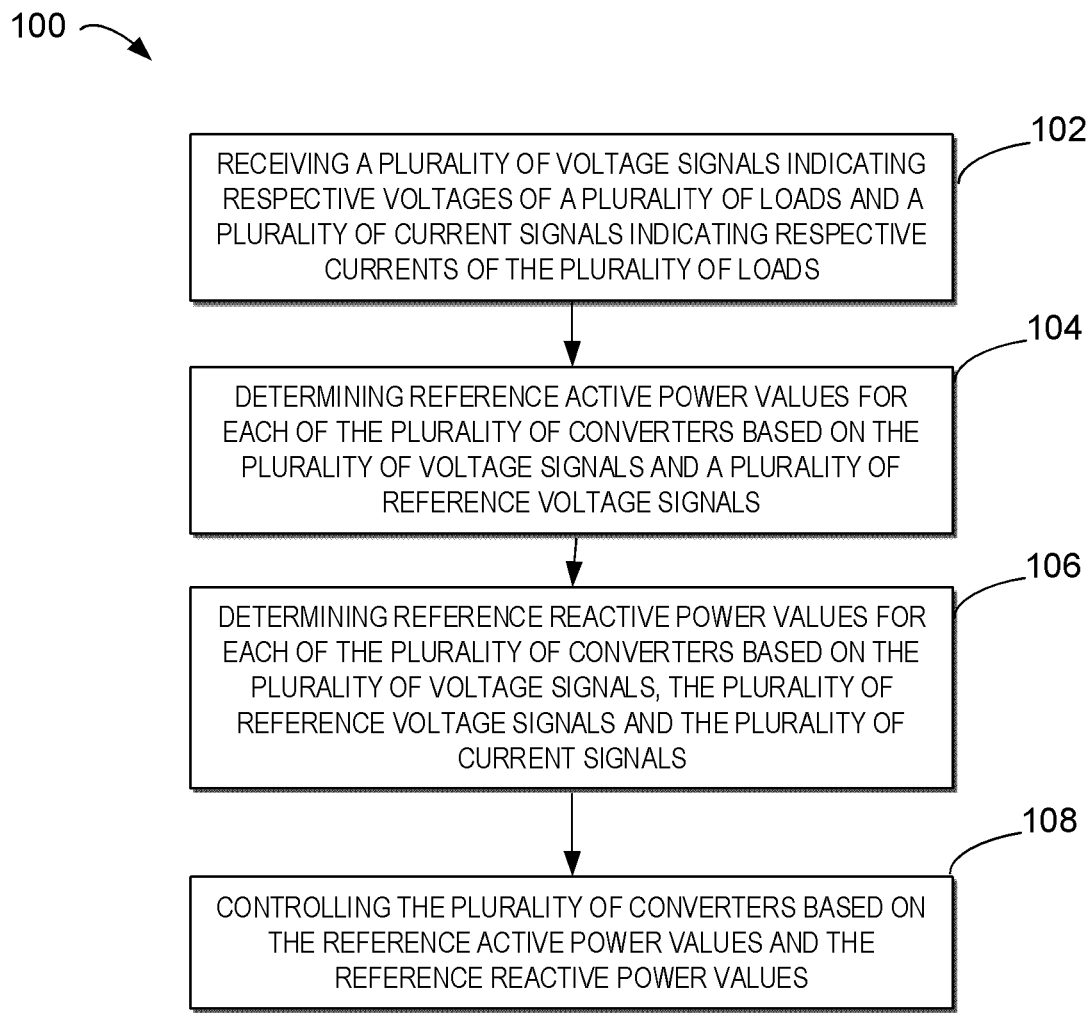
FIG. 4 illustrates a method of controlling a FID in accordance with some example embodiments of the present disclosure.
FIG. 5 illustrates a method of manufacturing a FID in accordance with some example embodiments of the present disclosure.

FIG. 4 illustrates a method 100 of controlling a FID in accordance with some example embodiments of the present disclosure. In 102, the FID may receive a plurality of voltage signals indicating respective voltages of a plurality of load branches and a plurality of current signals indicating respective currents of the plurality of load branches.

In 104, the FID may determine reference active power values for each of the plurality of converters based on the plurality of voltage signals and a plurality of reference voltage signals.

In 106, the FID may determine reference reactive power values for each of the plurality of converters based on the plurality of voltage signals, the plurality of reference voltage signals and the plurality of current signals.

In 108, the FID may control the plurality of converters based on the determined reference active power values and the determined reference reactive power values.

Although the method 100 is illustrated in FIG. 4, this is only for illustration without suggesting any limitations as to the scope of the subject matter described here. For example, it is to be understood that all the features for the FIGS. 1-3 can be applied to the method 100.

FIG. 5 illustrates an example of a method 200 for manufacturing a FID in accordance with some example embodiments of the present disclosure. In 202, it is provided one or more processors configured to perform the method 100 with one or more programs stored in a storage medium.

Although the one or more processors are illustrated in FIG. 5, this is only for illustration without suggesting any limitations as to the scope of the subject matter described here. For example, other computation devices, such as a field programmable gate array (FPGA), a digital signal processor (DSP), an application specific integrated device (ASIC) and so on, may be utilized to perform the method 100.

Although the method 200 is illustrated in FIG. 5, this is only for illustration without suggesting any limitations as to the scope of the subject matter described here. For example, it is to be understood that all the features for the FIGS. 1-3 can be applied to the method 200.

Figure 6:
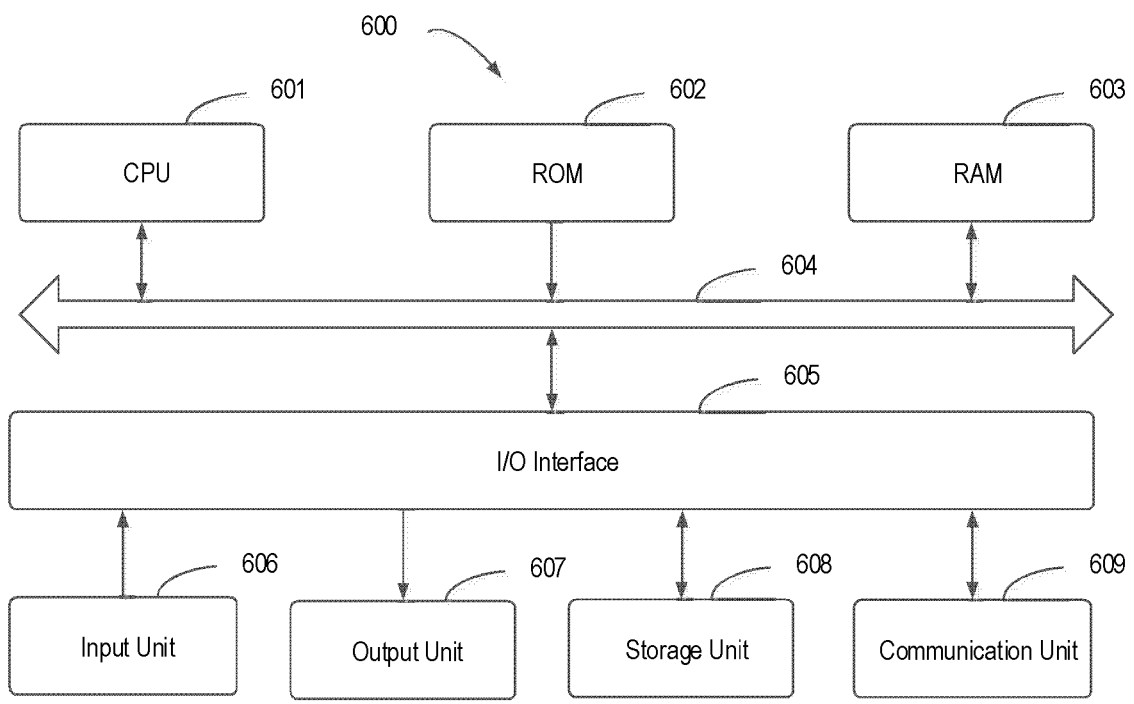
FIG. 6 illustrates an example device of implementing the method of FIG. 4 in accordance with some example embodiments of the present disclosure.

FIG. 6 illustrates a schematic diagram of a device 600 for implementing embodiments of the present disclosure. The device 600 can be the system 100 described above. As shown, the device 600 includes a central process unit (CPU) 601, which can act as the above described controller 610.

The CPU 601 can perform various suitable acts and processing based on the computer program instructions stored in the read-only memory (ROM) 602 or the computer program instructions loaded into the random-access memory (RAM) 603 from the storage unit 608.

Various kinds of programs and data required by the operations of the device 600 can also be stored in the RAM 603. CPU 601, ROM 602 and RAM 603 are connected to each other via a bus 604. The input/output (I/O) interface 605 is also connected to the bus 604.

A plurality of components in the device 600 are connected to the I/O interface 605, including: an input unit 606, such as a keyboard, a mouse and the like; an output unit 607, such as various kinds of displays and loudspeakers and the like; a storage unit 608, such as a disk and an optical disk and the like; and a communication unit 609, such as a network card, a modem, a wireless communication transceiver and the like. The communication unit 609 allows the device 600 to exchange information/data with other devices via the computer network, such as the Internet, and/or various telecommunication networks.

Each procedure and processing described above, such as the method 100, can also be performed by the processing unit 601. For example, in some embodiments, the method 100 can be implemented as a computer software program tangibly included in the machine-readable medium, for example, the storage unit 608.

In some embodiments, the computer program can be partially or fully loaded and/or mounted to the device 600 via the ROM 602 and/or the communication unit 609. When the computer program is loaded to the RAM 603 and executed by the CPU 601, acts in one or more blocks of the above described method 400 can be implemented.

Generally, various embodiments of the present disclosure can be implemented by hardware or dedicated circuit, software, logic, or any combinations thereof. Some aspects can be implemented by hardware while other aspects can be implemented by firmware or software, in which the firmware or the software can be executed by the controller, the microprocessor or other computing devices.

Although aspects of the present disclosure are illustrated and described as block diagram and flow chart or represented using some other graphs, it should be understood that the block, device, system, technology or method described herein can be implemented by hardware, software, firmware, dedicated circuit or logic, universal hardware, or controller or other computing devices, or any combinations thereof in a non-restrictive manner.

In an example, the storage unit 608 may store one or more programs configured to be executed by one or more processors, the one or more programs including instructions for performing the method 100. It is to be understood that all the features for the FIGS. 1-3 can be applied to the method 100.

Hereinafter, some example implementations of the subject matter described herein will be listed.

Item 1: There is provided a method for controlling a flexible interconnection device including a plurality of converters. The method comprises receiving a plurality of voltage signals indicating respective voltages of a plurality of load branches and a plurality of current signals indicating respective currents of the plurality of load branches; determining reference active power values for each of the plurality of converters based on the plurality of voltage signals and a plurality of reference voltage signals; determining reference reactive power values for each of the plurality of converters based on the plurality of voltage signals, the plurality of reference voltage signals and the plurality of current signals; and controlling the plurality of converters based on the determined reference active power values and the determined reference reactive power values.

Item 2: The method of Item 1, the determining the reference active power values comprises: computing a voltage difference between one of the plurality of voltage signals and a corresponding one of the plurality of reference voltage signals; determining an absolute value of active power based on the voltage difference; and computing an active power value by multiplying the absolute value with a sorting sign corresponding to the absolute value.

Item 3: The method of Item 1 or 2, the determining the absolute value of active power comprises: integrating the voltage difference by a proportion integrator to generate an integral value; and filtering the integrated value to generate the absolute value of active power.

Item 4: The method any of Items 1-3, further comprising: generating the sorting signs based on the plurality of voltage signals and the plurality of reference voltage signals.

Item 5: The method of any of Items 1-4, the generating the sorting sign comprises computing voltage differences between voltages of the plurality of voltage signals and the corresponding ones of the plurality of reference voltage signals, respectively; computing an average value of the voltage differences; computing a proportion between one of the voltage differences and the average value; and determining the sorting sign for the proportion with a hysteresis block, respectively.

Item 6: The method of any of Items 1-5, the determining the sorting sign for the proportion with the hysteresis block comprises: changing from a first sign to a second sign opposite to the first sign, in case that the proportion exceeds or equals to a first hysteresis threshold of the hysteresis block, and changing from the second sign to the first sign, in case that the proportion falls below or equals to a second hysteresis threshold of the hysteresis block, the second hysteresis threshold being below the first hysteresis threshold.

Item 7: The method any of Items 1-6, wherein the first sign is +1 and indicative of absorbing energy, and the second sign is −1 and indicative of outputting energy.

Item 8: The method any of Items 1-7, the determining the reference active power values further comprises dispatching active power to generate the reference active power values for the plurality of converters based on the computed active power values, respectively.

Item 9: The method any of Items 1-8, the dispatching the active power comprises for the computed active power value of greater than 0, outputting the computed active power value as the reference active power value; for the computed active power value of below 0, outputting a shared active power value as the reference active power value, the shared active power value representing a sum of the computed active power values of greater than 0 dividing by a number of the computed active power values of below 0.

Item 10: The method any of Items 1-9, the first and second hysteresis thresholds are configured to be selected based on at least one of power balance, conversion frequencies of the plurality of converters, and power loss of the flexible interconnection device.

Item 11: The method any of Items 1-10, the determining the reference reactive power values for the plurality of converters comprises: determining a reference current signal based on one of the plurality of voltage signals and a corresponding one of the plurality of reference voltage signals; determining a reactive current signal based on one of the plurality of current signals and a corresponding one of a plurality of phase angles; and determining the reference reactive power value based on the reference current signal and the reactive current signal.

Item 12: The method any of Items 1-11, the determining the reference current values comprises computing a voltage difference between the one of the plurality of voltage signals and the corresponding one of the plurality of reference voltage signals; integrating the voltage difference by a proportion integrator to generate the reference current value.

Item 13: The method any of Items 1-12, the determining the reactive current comprises: applying Park transformation to one of the plurality of current signals and a corresponding one of the plurality of phase angles to generate the reactive current value.

Item 14: The method any of Items 1-13, the plurality of reference voltage signals are indicative of nominal voltages defined by grid codes or voltages of secondary side of transformers.

Item 15: There is provided a flexible interconnection device (FID). The FID comprises one or more processors configured to perform any of the method of Items 1-14.

Item 16: There is provided an electronic system. The electronic system comprises the flexible interconnection device of Item 15.

Item 17: There is provided a method for manufacturing a FID. The FID comprises providing one or more processors configured to perform any of the method of claims 1-14 with one or more programs stored in a storage medium.

Item 17: There is provided a computer-readable storage medium storing one or more programs configured to be executed by one or more processors, the one or more programs including instructions for performing any of the methods of Items 1-14.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. On the other hand, various features that are described in the context of a single embodiment may also be implemented in multiple embodiments separately or in any suitable subcombination.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for controlling a flexible interconnection device that includes a plurality of converters, the method comprising:
   receiving a plurality of voltage signals indicating respective voltages of a plurality of load branches and a plurality of current signals indicating respective currents of the plurality of load branches;
   determining reference active power values for each of the plurality of converters based on the plurality of voltage signals and a plurality of reference voltage signals;
   determining reference reactive power values for each of the plurality of converters based on the plurality of voltage signals, the plurality of reference voltage signals and the plurality of current signals; and
   controlling the plurality of converters based on the determined reference active power values and the determined reference reactive power values to distribute power between the plurality of load branches to achieve balanced load distribution;
   wherein determining the reference active power values comprises:
      computing a voltage difference between one of the plurality of voltage signals and a corresponding one of the plurality of reference voltage signals;
      determining an absolute value of active power based on the voltage difference; and
      computing an active power value by multiplying the absolute value with a sorting sign corresponding to the absolute value
   wherein determining the absolute value of active power comprises:
      integrating the voltage difference by a proportion integrator to generate an integral value; and
      filtering the integrated value to generate the absolute value of active power.

2. The method of claim 1, further comprising generating the sorting sign based on the plurality of voltage signals and the plurality of reference voltage signals.

3. The method of claim 2, wherein generating the sorting sign comprises:
   computing voltage differences between voltages of the plurality of voltage signals and the corresponding ones of the plurality of reference voltage signals, respectively;
   computing an average value of the voltage differences;
   computing a proportion between one of the voltage differences and the average value; and
   determining the sorting sign for the proportion with a hysteresis block, respectively.

4. The method of claim 3, wherein determining the sorting sign for the proportion with the hysteresis block comprises:
   changing from a first sign to a second sign opposite to the first sign, in case that the proportion exceeds or equals to a first hysteresis threshold of the hysteresis block, and
   changing from the second sign to the first sign, in case that the proportion falls below or equals to a second hysteresis threshold of the hysteresis block, the second hysteresis threshold being below the first hysteresis threshold.

5. The method of claim 4, wherein the first sign is +1 and indicative of absorbing energy and wherein the second sign is −1 and indicative of outputting energy.

6. The method of claim 5, wherein determining the reference active power values further comprises dispatching active power to generate the reference active power values for the plurality of converters based on the computed active power values, respectively.

7. The method of claim 6, wherein dispatching the active power comprises:
for the computed active power value of greater than 0, outputting the computed active power value as the reference active power value; and
for the computed active power value of below 0, outputting a shared active power value as the reference active power value, the shared active power value representing a sum of the computed active power values of greater than 0 dividing by a number of the computed active power values of below 0.

8. The method of claim 4, wherein the first and second hysteresis thresholds are configured to be selected based on at least one of power balance, conversion frequencies of the plurality of converters, and power loss of the flexible interconnection device.

9. The method of claim 1, wherein determining the reference reactive power values for the plurality of converters comprises:
determining a reference current value based on one of the plurality of voltage signals and a corresponding one of the plurality of reference voltage signals;
determining a reactive current value based on one of the plurality of current signals and a corresponding one of a plurality of phase angles; and
determining the reference reactive power value based on the reference current signal and the reactive current signal.

10. The method of claim 9, wherein determining the reference current value comprises:
computing a voltage difference between the one of the plurality of voltage signals and the corresponding one of the plurality of reference voltage signals; and
integrating the voltage difference by a proportion integrator to generate the reference current value.

11. The method of claim 9, wherein determining the reference reactive power value comprises applying a Park transformation to one of the plurality of current signals and a corresponding one of the plurality of phase angles to generate the reference reactive power value.

12. The method of claim 1, wherein the plurality of reference voltage signals are indicative of nominal voltages defined by grid codes or voltages of secondary side of transformers.

13. A flexible interconnection device, comprising:
one or more processors; and
memory storing program code that, when executed by the one or more processors, causes the one or more processor to:
obtain a plurality of voltage signals indicating respective voltages of a plurality of load branches and a plurality of current signals indicating respective currents of the plurality of load branches;
determine reference active power values for each of the plurality of converters based on the plurality of voltage signals and a plurality of reference voltage signals;
determine reference reactive power values for each of the plurality of converters based on the plurality of voltage signals, the plurality of reference voltage signals and the plurality of current signals; and
control the plurality of converters based on the determined reference active power values and the determined reference reactive power values to distribute power between the plurality of load branches to achieve balanced load distribution;
wherein the program code causes the one or more processor to determine the reference active power values by:
computing a voltage difference between one of the plurality of voltage signals and a corresponding one of the plurality of reference voltage signals;
determining an absolute value of active power based on the voltage difference; and
computing an active power value by multiplying the absolute value with a sorting sign corresponding to the absolute value;
wherein determining the absolute value of active power comprises:
integrating the voltage difference by a proportion integrator to generate an integral value; and
filtering the integrated value to generate the absolute value of active power.

14. The flexible interconnection device of claim 13, further comprising a plurality of sensors communicatively coupled to the one or more processors to provide the voltage signals and the current signals.

15. An electronic system, comprising:
a plurality of AC power sources;
a plurality of transformers, each transformer coupled to a respective one of the AC power sources;
the plurality of load branches, each load branch coupled to a respective one of the transformers;
a plurality of sensors located in the load branches; and
a flexible interconnection device coupled to the plurality of load branches, the flexible interconnection device comprising one or more processors and memory storing program code that, when executed by the one or more processors, causes the one or more processor to:
receive a plurality of voltage signals indicating respective voltages of a plurality of load branches and a plurality of current signals indicating respective currents of the plurality of load branches, the voltage signals and current signals being received from the sensors;
determine reference active power values for each of the plurality of converters based on the plurality of voltage signals and a plurality of reference voltage signals;
determine reference reactive power values for each of the plurality of converters based on the plurality of voltage signals, the plurality of reference voltage signals and the plurality of current signals; and
control the plurality of converters based on the determined reference active power values and the determined reference reactive power values to distribute power between the plurality of load branches to achieve balanced load distribution;
wherein the program code causes the one or more processor to determine the reference active power values by:
computing a voltage difference between one of the plurality of voltage signals and a corresponding one of the plurality of reference voltage signals;
determining an absolute value of active power based on the voltage difference; and
computing an active power value by multiplying the absolute value with a sorting sign corresponding to the absolute value;
wherein determining the absolute value of active power comprises:

integrating the voltage difference by a proportion integrator to generate an integral value; and filtering the integrated value to generate the absolute value of active power.

16. The system of claim 15, wherein the plurality of reference voltage signals are indicative of nominal voltages defined by grid codes or voltages of secondary sides of the transformers.

* * * * *